United States Patent [19]

Kuwabara et al.

[11] Patent Number: 4,629,393
[45] Date of Patent: Dec. 16, 1986

[54] METHOD OF OPERATING MULTISTAGE HYDRAULIC MACHINERY

[75] Inventors: Takao Kuwabara; Akihiro Sakayori, both of Hitachi, Japan

[73] Assignee: Hitachi, Ltd., Tokyo, Japan

[21] Appl. No.: 735,752

[22] Filed: May 20, 1985

[30] Foreign Application Priority Data

May 21, 1984 [JP] Japan .................. 59-100543
Jul. 27, 1984 [JP] Japan .................. 59-158255

[51] Int. Cl.⁴ ........................................ F01D 17/00
[52] U.S. Cl. ............................ 415/1; 415/24; 415/500
[58] Field of Search ............... 415/1, 13, 20, 22, 24, 415/26, 27, 47, 48, 49, 50, 500

[56] References Cited

U.S. PATENT DOCUMENTS

| 4,468,167 | 8/1984 | Ogiwara et al. | 415/500 X |
| 4,537,558 | 8/1985 | Tsunoda et al. | 415/500 |
| 4,538,957 | 9/1985 | Yamagata et al. | 415/1 |

FOREIGN PATENT DOCUMENTS

| 47-38336 | 9/1972 | Japan . | |
| 57-20567 | 2/1982 | Japan | 415/500 |
| 56-13799 | 8/1982 | Japan | 415/500 |
| 56-96303 | 12/1982 | Japan | 415/500 |
| 59-58163 | 4/1984 | Japan | 415/24 |

Primary Examiner—Robert E. Garrett
Assistant Examiner—Joseph M. Pitko
Attorney, Agent, or Firm—Beall Law Offices

[57] ABSTRACT

In a water level depressing operation of a multistage hydraulic machine, first, the guide vane in the maximum-pressure stage is totally closed. Then, the respective guide vanes in the remaining stages are left opened more or less, and compressed air is supplied, whereby the water level is depressed below the runner in the runner chamber in the minimum-pressure stage. Thereafter, the respective guide vanes in the stages other than the maximum-pressure stage are also totally closed. Then, when the water level in each of the runner chambers is raised as a result of, for example, leakage of water from the associated guide vane, compressed air is individually replenished to each of the runner chambers. Moreover, the accumulated water in the return blade passage is discharged to, the subsequent pressure stage runner chamber through the guide vane and finally to the draft tube owing to the individual control of the pressures of the respective runner chambers, whereby the water level in each of the runner chambers is controlled. Accordingly, it is possible to reliably depress the water level.

14 Claims, 3 Drawing Figures

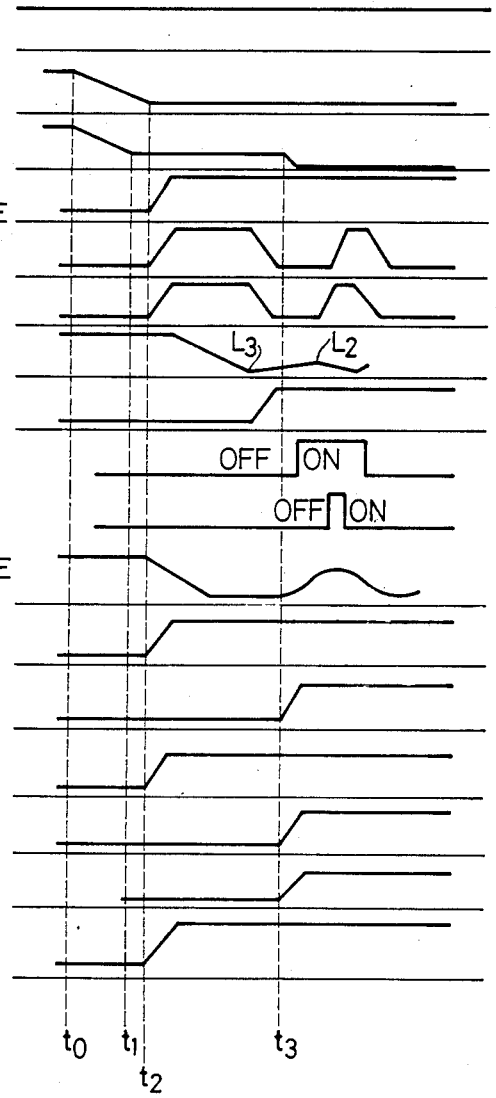

FIG. 2

(A) MAIN SHAFT 1
(B) UPPER-STAGE MOVABLE GUIDE VANE 7
(C) LOW-STAGE MOVABLE GUIDE VANE 8
(D) WATER LEAK CHARGING VALVE
(E) AIR CHARGING VALVE 9
(F) AIR CHARGING VALVE 11
(G) DRAFT TUBE WATER LEVEL
(H) STOP VALVE 14
(I) WATER LEVEL DETECTOR 17
(J) WATER LEVEL DETECTOR 16
(K) RETURN VANE FLOW PASSAGE WATER LEVEL
(L) RUNNER SEAL WATER CHARGE VALVE
(M) RUNNER BAND DRAINAGE VALVE 22
(N) GUIDE VANE LEAKAGE WATER DRAINAGE VALVE 21
(O) AIR DISCHARGING VALVE 13
(P) RUNNER BAND DRAINAGE VALVE 20
(Q) GUIDE VANE LEAKAGE WATER DRAINAGE VALVE 19

FIG. 3

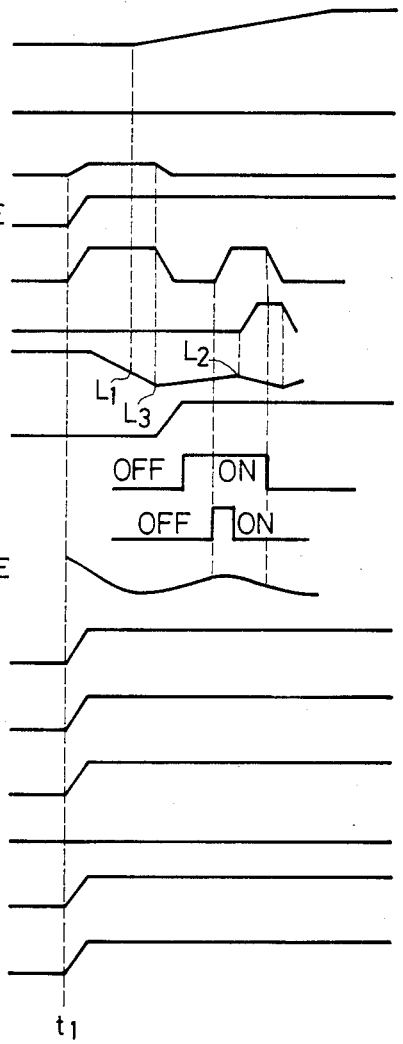

(A) MAIN SHAFT 1
(B) UPPER-STAGE MOVABLE GUIDE VANE 7
(C) LOW-STAGE MOVABLE GUIDE VANE 8
(D) WATER LEAK CHARGING VALVE
(E) AIR CHARGING VALVE 9
(F) AIR CHARGING VALVE 11
(G) DRAFT TUBE WATER LEVEL
(H) STOP VALVE 14
(I) WATER LEVEL DETECTOR 17
(J) WATER LEVEL DETECTOR 16
(K) RETURN VANE FLOW PASSAGE WATER LEVEL
(L) RUNNER SEAL WATER CHARGE VALVE
(M) RUNNER BAND DRAINAGE VALVE 22
(N) GUIDE VANE LEAKAGE WATER DRAINAGE VALVE 21
(O) AIR DISCHARGING VALVE 13
(P) RUNNER BAND DRAINAGE VALVE 20
(Q) GUIDE VANE LEAKAGE WATER DRAINAGE VALVE 19

METHOD OF OPERATING MULTISTAGE HYDRAULIC MACHINERY

BACKGROUND OF THE INVENTION

The present invention relates to a method of operating multistage hydraulic machinery. More particularly, the invention pertains to a method of operating a multistage hydraulic machine with movable guide vanes, which effects depression of the water level when starting a pumping operation or effecting a condenser operation.

To effect starting or a condenser operation of a large-capacity reversible pump-turbine or the like, it is general practice to employ a motor-generator or a starting motor which is directly connected to the main shaft. In such a case, it is common to conduct starting in air for the purpose of reducing the starting torque required for the motor.

In order to realize starting in air, it is necessary to expel water from the runner chamber. To effect expelling of water from the runner chamber, it is general practice to depress the water level in the state wherein the guide vane in the maximum-pressure stage is totally closed, while the respective guide vanes in the remaining stages are opened.

In a conventional multistage hydraulic machine with movable guide vanes, for example, a two-stage reversible pump-turbine, a water level depressing operation is conducted as follows. The guide vane in the upper stage is totally closed, while the guide vane in the lower stage is totally opened, and compressed air is forcedly supplied from the back-pressure chamber of the runner in the upper stage. The water present around the runner is passed through a return blade passage by means of the compressed air and is successively forced into the runner chamber through the guide vane in the lower stage, which is the final stage, whereby the water level is depressed.

Thus, the level of water around the pump runner is depressed by means of the compressed air so that the runners are exposed to the air when effecting starting in air.

However, if it is taken into consideration that the depression of the water level is originally effected for the purpose of reducing the torque required for starting the runners, it may not be necessary to expel the whole of the water present within the return blade passage and it may be sufficient to expel the water around the runner in each of the stages.

On the basis of this idea, a multistage hydraulic machine has been invented which is provided with a by-pass tube which extends from a return blade passage portion such as to communicate with a draft tube, such as the shown in Japanese Patent Publication No. 38336/1972.

The above-described invention, however, involves the following disadvantages: (1) it is necessary to employ a by-pass tube having a considerably large diameter and to provide an automatic valve on the by-pass tube; (2) the return blade passage portion is originally narrow and, therefore, it is not easy from the viewpoint of space to provide the by-pass tube and the automatic valve at the return passage portion; and (3) if the by-pass valve should have a failure (for example, if the valve should open during a normal turbine or pump operation), leakage of water will produce a loss in the turbine or pump efficiency, and further, since the pressure in the return blade passage portion is high in a normal turbine or pump operation unlike that in the water level depressing operation, the by-pass valve may involve vibrations.

In the case of a reversible pump-turbine, it is necessary for it to be able to maintain the water level in a depressed state while the pump-turbine is rotating in the pumping operation mode. In view of this, the following problem may be experienced. In the pumping operation mode, the runner in one stage acts during the water level depressing operation such as to centrifugally blow away the cooling water supplied to the runner and the water dropping from the upper-stage runner chamber and to convey the water back to the higher-pressure stage. Since it is necessary for the above-described water to be finally discharged to the draft tube, the above-described counterflow phenomenon is disadvantageous and involves an essential drawback.

SUMMARY OF THE INVENTION

Accordingly, it is a primary object of the present invention to provide a method of operating a multistage hydraulic machine by which it is possible to reliably depress the water level with a simple structure.

To this end, according to the invention, first, a predetermined water level depression is attained in the state wherein the guide vane in the maximum-pressure stage is totally closed, while the respective guide vanes in the remaining stages are opened to a small extent. Then, the guide vanes in the latter stages are closed, and the water level control for the return blade passage is effected. Thereafter, the water level control for the runner chamber in the maximum-pressure stage (for example, in the return blade passage) and the water level control for the runner chambers in the remaining stages (for example, in the draft tube) are separately effected. Thus, the multistage hydraulic machine is operated in such a manner that, while the air pressure for depressing the water level in the runner chamber in the maximum-pressure stage is maintained at a level higher than the pressure of the remaining water on the outer periphery of the runner of the next pressure stage and similarly, the air pressure for depressing the water level in any subsequent runner chamber is maintained at a level higher than the pressure on the outer periphery of the runner of its next pressure stage, the water dropping from the runner chamber in the higher pressure stage and the cooling water supplied to each of the runners in the remaining stages are smoothly discharged to the draft tube through the runner chambers in the latter stages without gathering in the return blade passage of any pressure stage. According to the present invention, it is advantageously possible to reliably depress the water level.

BRIEF DESCRIPTION OF THE DRAWINGS

FIG. 2 is a time chart showing the method of shifting the operation mode from the turbine mode to the condenser operation mode according to the present invention; and FIG. 3 is a time chart showing the pump starting operation according to the present invention.

DETAILED DESCRIPTION OF THE PREFERRED EMBODIMENT

Figure 1:
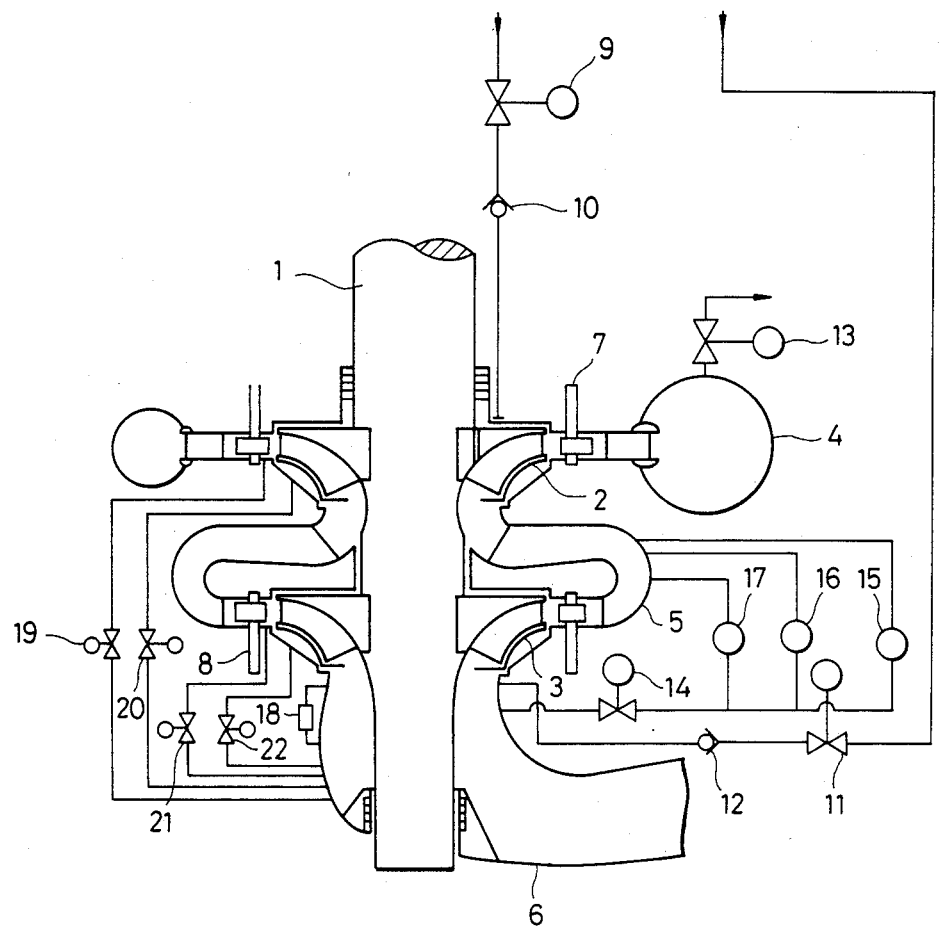
FIG. 1 is a schematic view of the arrangement of a two-stage reversible pump-turbine showing one embodiment of the present invention.

The present invention will be described hereinunder through one embodiment. FIG. 1 shows one embodiment of the present invention in which the invention is applied to a two-stage reversible pump-turbine.

An upper-stage runner 2 which is mounted on a main shaft 1 is supplied with compressed air from an air charging valve or an air supply valve 9 through a check valve 10. On the other hand, a lower-stage runner 3 is supplied with compressed air from an air charging valve or an air supply valve 11 through a check valve 12. A spiral case 4 is provided with an air discharging valve or an air exhaust valve 13.

A return blade passage 5 is provided with the three detectors for detecting three different water levels in the return blade passage 5, that is, a first-stage water level detector 15, a second-stage water level detector 16 and a third-stage water level detector 17. These detectors 15, 16 and 17 are connected to an automatic stop valve 14 which is in turn connected to a draft tube 6. The draft tube 6 is provided with a draft tube water level detector 18 for detecting the water level in the draft tube 6.

In the vicinity of a movable guide vane 7 in the upper stage is provided a guide vane leakage water drain valve 19 for draining the water leaking out from the clearance of the guide vane 7 to the draft tube 6. In the vicinity of the upper-stage runner 2 is provided a runner band drain valve 20 for draining the water accumulated around the runner to the draft tube 6. A movable guide vane 8 in the lower stage and the lower-stage runner 3 are respectively provided with a guide vane leakage water drain valve 21 and a runner band drain valve 22.

(OPERATION IN THE GENERATING OPERATION MODE)

Operation mode transfers from the generating mode to the synchronous condenser mode will be described hereinunder by employing the time chart shown in FIG. 2. During a generating operation in which the main shaft 1 is rotating as shown by (A), at a time $t_0$ the upper-stage movable guide vane 7 in the upper stage is actuated in its closing direction as shown by (B) as soon as the operation transfer signal is given, and the movable guide vane 8 in the lower stage is actuated in its closing direction as shown by (C).

When the lower-stage movable guide vane 8 reaches a predetermined degree of opening (at a time $t_1$), the operation of the low-stage movable guide vane 8 is suspended as shown by (C). When the upper-stage movable guide vane 7 has been totally closed (at a time $t_2$), the following valves start to open, that is, a leakage water make-up valve or a water leak charging valve, the air supply valves 9, 11, a runner seal cooling water valve or a runner seal water charge valve and the guide vane leakage water drain valves 19, 21 as respectively shown by (D), (E), (F), (L), (Q) and (N).

The leakage water make-up valve is adapted to allow a predetermined amount of water to be continuously fed to the spiral case 4 while by-passing an inlet valve so that water is not replaced by air as result of an excessive lowering in the pressure in the spiral case 4 during an operation in air wherein the inlet valve is totally closed.

When the air charging valves 9 and 11 are totally opened, compressed air is supplied into the return blade passage 5 and the draft tube 6, whereby the level of the water filling the upper-stage runner chamber as far as the upper-stage movable guide vane 7 is gradually depressed by means of the compressed air and the water level in the lower stage runner chamber is gradually depressed as well. The return blade passage water level first lowers as shown by (K), and the draft tube water level then lowers as shown by (G).

When the draft tube water level lowers to $L_3$ and shown by (G), the automatic stop valve 14 starts to open as shown by (H). At the same time, the air charging valves 9 and 11 are closed as respectively shown by (E) and (F). When the automatic stop valve 14 is totally opened, the lower-stage movable guide vane 8 at a predetermined opening position is actuated in its totally closing direction as shown by (C).

At the same time, the runner band drain valves 22 and 20 start to open as respectively shown by (M) and (P), and the air discharging valve 13 opens as shown by (O). After the low-stage movable guide vane 8 has been totally closed, the water level control in the return blade passage is effected in accordance with values respectively detected by the second- and third-stage water level detectors 16 and 17 as respectively shown by (J) and (I).

When the draft tube water level detector 18 detects the fact that the draft tube water level is at and above $L_2$ as shown by (G), air charging valve 11 is opened as shown by (F), whereby the draft tube water level varies as shown by (G). When the second-stage water level detector 16 detects the water level as shown by (J), the air charging valve 9 is opened as shown by (E), whereby the water level in the return blade passage 5 starts to lower as shown at (16). When the water level returns to a predetermined value, the third-stage water level detector 17 for the return blade passage is switched over as shown by (I), whereby the air charging valve 9 is closed.

(OPERATION IN THE PUMPING OPERATION MODE)

The pumping operation mode will now be described by employing the time chart shown in FIG. 3. In a state wherein the main shaft 1 is not rotating at all as shown by (A), the lower-stage movable guide vane 8 is actuated to a predetermined opening position as shown by (C) at a time $t_1$.

At the same time, the following valves are opened, that is, the leakage water make-up valve, the air charging valve 9, the runner seal cooling water valve, the guide vane leakage water drain valve 19, the runner band drain valve 20, the guide vane leakage water drain valve 21 and the runner band drain valve 22 as respectively shown by (D), (E), (L), (Q), (P), (N) and (M).

Thereafter, when the draft tube water level detector 18 detects the fact that the draft tube water level shown by (G) is at and below a water level $L_1$, the main shaft 1 starts to rotate as shown by (A) and the air discharging valve 13 is opened as shown by (O).

When the draft tube water level reaches a water level $L_3$ as shown by (G), the lower-stage movable guide vane 8 is closed as shown by (C) and, at the same time, the automatic stop valve 14 is totally opened as shown by (H).

Consequently, the third- and second-stage water level detector 17 and 16 effect ON/OFF operation as respectively shown by (I) and (J). When the detector 18 detects the fact that the draft tube water level shown by (G) reaches the water level $L_2$, the air charging valve 11 is controlled as shown by (F), and in response to the operation of the water level detectors 16 and 17 for the return blade passage water level shown by (K), the air charging valve 9 is controlled as shown by (E).

Thus, it is not necessary according to this embodiment to provide a by-pass tube which is conventionally disposed such as to extend from the return blade passage 5 and to communicate with the draft tube 6. Therefore, the structure required for operating the multistage hydraulic machine is extremely simple. Further, according to this embodiment, there is no possibility of the problems related to the bypass valve according to the Japanese Patent Publication No. 38336/1972.

Furthermore, it is possible to prevent any counterflow of water by effecting control such that the water dropping from the upper-stage runner chamber and the cooling water supplied to the lower-stage runner are smoothly passed through the lower-stage runner chamber and discharged finally to the draft tube without gathering in the return blade passage, while maintaining the water level depressing air pressure in the upperstage runner chamber at a level higher than the water pressure on the outer periphery of the lower-stage runner.

It is to be noted that, although in this embodiment the water level in the return blade passage 5 is detected by employing the water level detectors 15 to 17, a flowmeter may be employed in place of the water level detectors. In such a case, when the automatic stop valve 14 is opened, any water which is present on the upstream side of the flowmeter flows and the flowmeter is thereby actuated; therefore, it is possible to detect the water level through the flowmeter.

What is claimed is:

1. A method of operating a multistage hydraulic machine which has a movable guide vane provided in each of the stages and is arranged such that it is possible to individually supply compressed air to a runner chamber in each of the stages as well as to individually detect the water level in the runner chamber in each of the stages, said method comprising the steps of, in a water level depressing operation: supplying compressed air in a state wherein the movable guide vane in the maximum-pressure stage is totally closed, while the respective movable guide vanes in the remaining stages are opened; totally closing said movable guide vanes in the stages other than the maximum-pressure stage after detecting the fact that the water in the runner chamber at least in the minimum-pressure stage (the minimum-pressure stage alone or a plurality of stages including the minimum-pressure stage) has once been expelled; and while individually detecting the water level in each of the runner chambers, individually replenishing compressed air in response to said water level detection, thereby individually controlling the water level in each of said runner chambers.

2. A method of operating a multstage hydraulic machine according to claim 1, for shifting the operation mode from the turbine mode to the condenser mode, further comprising the steps of:
   maintaining the rotational speed of the turbine shaft throughout the method steps;
   fully closing the maximum-pressure stage movable guide vane and partially closing the lower stage movable guide vanes, both prior to said step of supplying compressed air.

3. The method of operating a multistage hydraulic machine according to claim 2, including simultaneously opening valves individually supplying compressed air to each runner chamber during said step of supplying compressed air.

4. The method of operating a multistage hydraulic machine according to claim 3, further including opening a water leak charging valve and opening a runner seal water charge valve, both simultaneously with said opening of the compressed air supplying valves.

5. The method of operating a multistage hydraulic machine according to claim 3, further including the steps of:
   opening the guide vane leakage water drainage valve for each of said stages simultaneously with said opening of the compressed air supplying valves; and
   opening the runner band drainage valves for each of said stages and opening an air discharging valve communicating with the spiral inlet casing for the maximum-pressure stage, all at about the time of said step of totally closing and prior to said step of individually detecting and individually replenishing.

6. The method of operating a multistage hydraulic machine according to claim 5, further including the step of preventing bypass water communication between areas downstream of each stage that would bypass the lower stage runners during said step of supplying compressed air, and establishing said bypass water communication during said steps of individually detecting and individually replenishing.

7. The method of operating a multistage hydraulic machine according to claim 3, further including the step of preventing bypass water communication between areas downstream of each stage that would bypass the lower stage runners during said step of supplying compressed air, and establishing said bypass water communication during said steps of individually detecting and individually replenishing.

8. The method of operating a multistage hydraulic machine according to claim 2, further including the step of preventing bypass water communication between areas downstream of each stage that would bypass the lower stage runners during said step of supplying compressed air, and establishing said bypass water communication during said steps of individually detecting and individually replenishing.

9. The method of operating a multistage hydraulic machine according to claim 1, further including the step of preventing bypass water communication between areas downstream of each stage that would bypass the lower stage runners during said step of supplying compressed air, and establishing said bypass water communication during said steps of individually detecting and individually replenishing.

10. A method of operating a multistage hydraulic machine which has a movable guide vane provided in each of the stages and is arranged such that it is possible to individually supply compressed air to a runner chamber in each of the stages as well as to individually detect the water level in the runner chamber in each of the stages, said method comprising the steps of, in a water level depressing operation: successively completing water level depression in all the runner chambers, from the runner chamber in the maximum-pressure stage to the respective runner chambers in the smaller-pressure stages in a state wherein the guide vane in the maximum-pressure stage is totally closed, while the respective guide vanes in the remaining stages are closed to a small extent; totally closing the guide vane in the second stage when the water level depression in the runner chamber in the maximum-pressure stage has been completed, thereby effecting the individual water level control for the runner chamber in the maximum-pressure stage; and, totally closing, in the same manner, the guide vane in a subsequent stage after the water level depression in the runner chamber in each of the remaining stages has been completed, thereby effecting the individual water level control for said runner chamber.

11. The method of operating a multistage hydraulic machine according to claim 10, for a pump starting operation wherein the lower stage movable guide vanes are first partially opened from being totally closed while opening a valve supplying compressed air to the maximum-pressure stage while maintaining the upper stage movable guide vane totally closed and the air charging valve for the lower stages totally closed to depress the water level in the draft tube, all as a first part of said step of successively completing water level depression;

increasing the rotational speed of the shaft until it reaches synchronous speed while maintaining the upper stage movable guide vane totally closed.

12. The method of operating a multistage hydraulic machine according to claim 11, while individually detecting the water level in each of the runner chambers, individually replenishing compressed air in response to said water level detection, thereby individually controlling the water level in each of said runner chambers.

13. The method of operating a multistage hydraulic machine according to claim 12, further including the step of preventing bypass water communication between areas downstream of each stage that would bypass the lower stage runners during supplying compressed air, and establishing said bypass water communication during said steps of individually detecting and individually replenishing.

14. The method of operating a multistage hydraulic machine according to claim 13, further including opening each guide vane leakage water drainage valve for each stage while simultaneously opening the runner band drainage valve for each stage, while opening the runner seal water charge valve during said step of opening the valve supplying compressed air to the maximum-pressure stage.

* * * * *